US006861948B2

(12) United States Patent
Lee et al.

(10) Patent No.: US 6,861,948 B2
(45) Date of Patent: Mar. 1, 2005

(54) VEHICLE WIRELESS ALARM SYSTEM

(76) Inventors: Hong-Chiu Lee, 235 Chung-Ho, Box 8-24, Taipei (TW); Chung-Kwei Yu, 235 Chung-Ho, Box 8-24, Taipei (TW)

( * ) Notice: Subject to any disclaimer, the term of this patent is extended or adjusted under 35 U.S.C. 154(b) by 162 days.

(21) Appl. No.: 10/384,281

(22) Filed: Mar. 11, 2003

(65) Prior Publication Data

US 2004/0178926 A1 Sep. 16, 2004

(51) Int. Cl.[7] .................................................. B60Q 1/00

(52) U.S. Cl. ....................... 340/436; 340/463; 340/479; 340/903; 340/435

(58) Field of Search ................................ 340/436, 901, 340/902, 903, 904, 456, 463, 464, 466, 467, 479, 435

(56) References Cited

U.S. PATENT DOCUMENTS 3,891,966 A * 6/1975 Sztankay .................... 340/903
4,692,764 A * 9/1987 Bonar ......................... 342/71
5,162,794 A * 11/1992 Seith .......................... 340/903
5,684,474 A * 11/1997 Gilon et al. ................ 340/903
6,707,391 B1 * 3/2004 Monroe ...................... 340/901
6,765,495 B1 * 7/2004 Dunning et al. ............ 340/903

* cited by examiner

*Primary Examiner*—Jeffery Hofsass
*Assistant Examiner*—Daniel Previl

(57) ABSTRACT

A vehicle wireless alarm system comprises a front car subsystem installed in a front car and a rear car subsystem installed in a rear car. The front car is in front of the rear car. The front car subsystem comprises a reverse car sensor and a brake car sensor; an alarm source; an oscillator; an encoder; an amplifier receiving signals; and a transmitter for emitting the receiving signals wirelessly as emitting signals. The rear car subsystem comprises a receiver receiving the transmitting signals; an amplifier; a decoder; an output device and outputting the receiving signals; and an alarm device receiving signals from the output device and emits alarm signals. By above system, a driver in the rear car can know that the front car now reverses or brakes.

4 Claims, 4 Drawing Sheets

VEHICLE WIRELESS ALARM SYSTEM

FIELD OF THE INVNETION

The present invention relates to alarm systems, and particularly to a vehicle wireless alarm system, wherein the status of reversing or braking a front side car can be informed to a rear car by the system of the present invention.

BACKGROUND OF THE INVENTION

In driving a car, in general, the drivers know the front car conditions by the lights emitted from the front car lights. However in bad whether, such as raining days, fog days, and snowy days or the lights of the front car are destroyed. Then the status of the front car can not be identified clearly so that the drivers of the rear car can not correctly judge the condition of the front car. As a result, some accidents possibly occur.

SUMMARY OF THE INVENTION

Accordingly, the primary object of the present invention is to provide a vehicle wireless alarm system which can provide the front car status to the driver at the rear car by ways other than the front car lights.

To achieve above the primary object of the present invention is to provide a vehicle wireless alarm system which comprises a front car subsystem installed in a front car and a rear car subsystem installed in a rear car. The front car is in front of the rear car. The front car subsystem comprises a reverse car sensor and a brake car sensor; an alarm source; an oscillator; an encoder; an amplifier receiving signals; and a transmitter for emitting the receiving signals wirelessly as emitting signals. The rear car subsystem comprises a receiver receiving the transmitting signals; an amplifier; a decoder; an output device and outputting the receiving signals; and an alarm device receiving signals from the output device and emits alarm signals.

Another object of the present invention is to provide a vehicle wireless alarm system, wherein in a one operation mode, the front car is installed with the front car subsystem and the rear car is installed with the front car subsystem and the rear car subsystem; the rear car receives the signals from the front car and displays the signals; when the rear car is reversed or braked, the rear car transmits alarm signals to a car at a back side.

The various objects and advantages of the present invention will be more readily understood from the following detailed description when read in conjunction with the appended drawing.

BRIEF DESCRIPTION OF THE PREFERRED EMBODIMENTS

A vehicle wireless alarm system comprises a front car subsystem installed in a front car A and a rear car subsystem installed in a rear car B. The front car A is in front of the rear car B.

Figure 1:
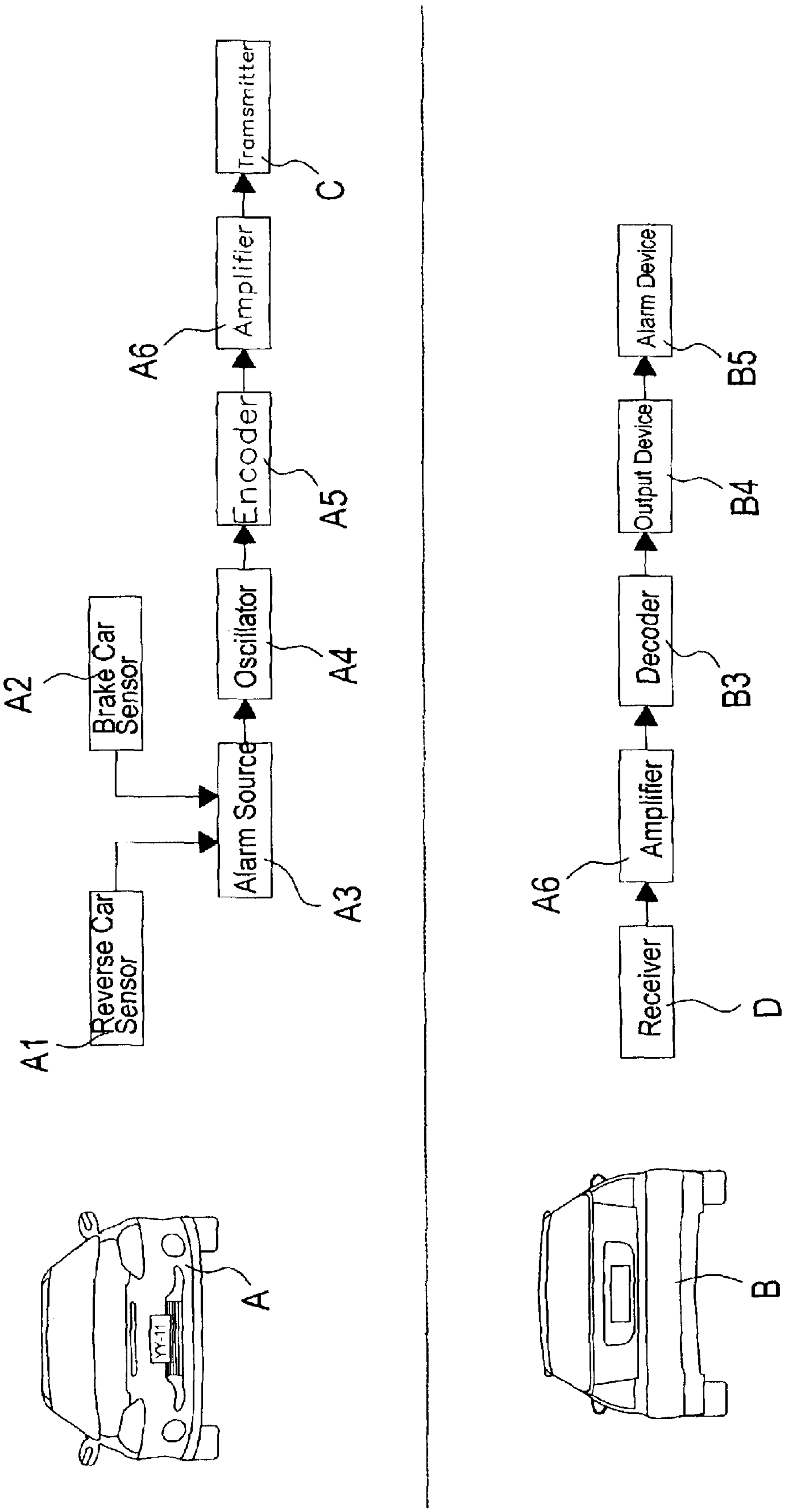
FIG. 1 is a system block diagram of the present invention.
Figure 2:
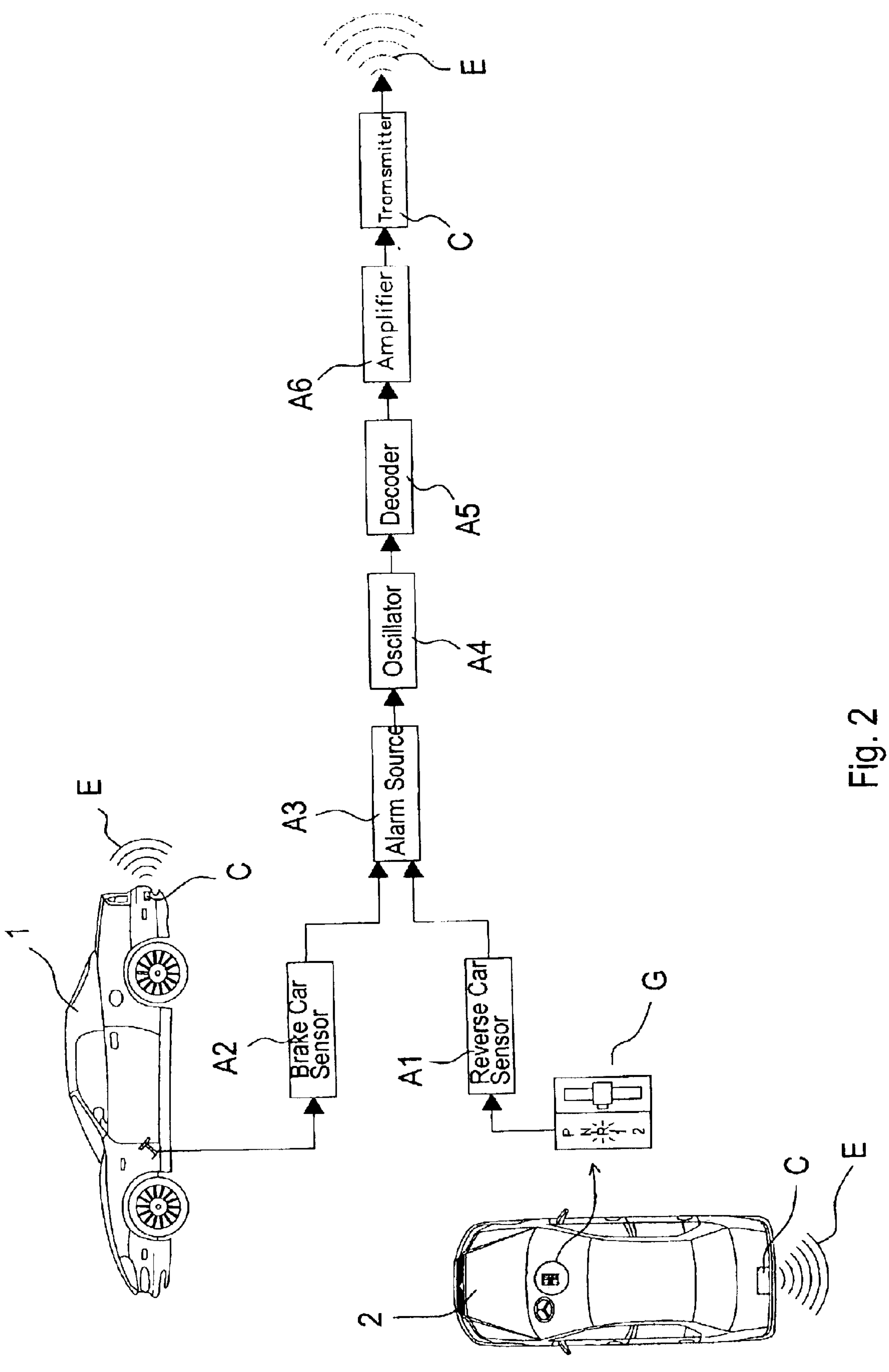
FIG. 2 shows the front car subsystem of the present invention.

The front car subsystem is installed in a front car A, and has a reverse car sensor A1 and a brake car sensor A2; an alarm source A3 receiving signals from the reverse car sensor A1 and brake car sensor A2; an oscillator A4 receiving signals from the alarm source A3 for mixing the receiving signals with carriers signals; an encoder A5 receiving signals from the oscillator A4 for encoding the receiving signals; an amplifier A6 receiving signals from the encoder A5 for amplifying the input signals to have a larger power for transmission; and a transmitter C for receiving the signals from the amplifier A6 for emitting the receiving signals as emitting signals E, as shown in FIG. 2.

Figure 3:
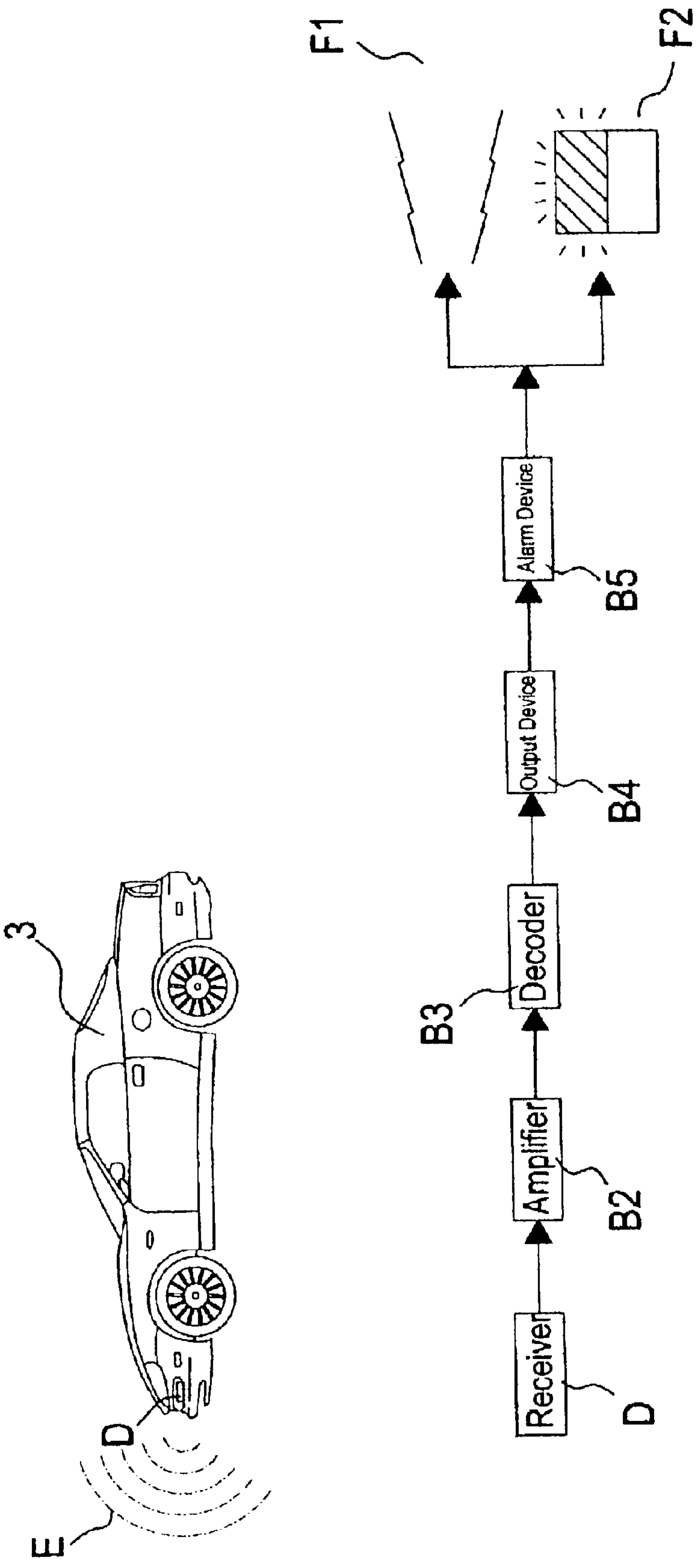
FIG. 3 shows the rear car subsystem of the present invention.

The rear car subsystem is installed to a rear car B and has a receiver D receiving the transmitting signals from the transmitter C; an amplifier receiving signals from the receiver D for amplifying the signals; a decoder B3 for receiving signals from the amplifier A6 for decoding the receiving signals; an output device B4 receiving signals from the decoder B3 and outputting the receiving signals and an alarm device B5 receiving signals from the output device B4 and emits alarm signals. The alarm signals can be one of speech F1 or light F2 (see FIG. 3), or texts. Thereby, the driver in the rear car can know that the front car now reverses or brakes.

In the first operation mode of the present invention, the front car is installed with the front car subsystem and the rear car is installed the rear car subsystem and the rear car only receives the signals from the front car and display the signals.

Figure 4:
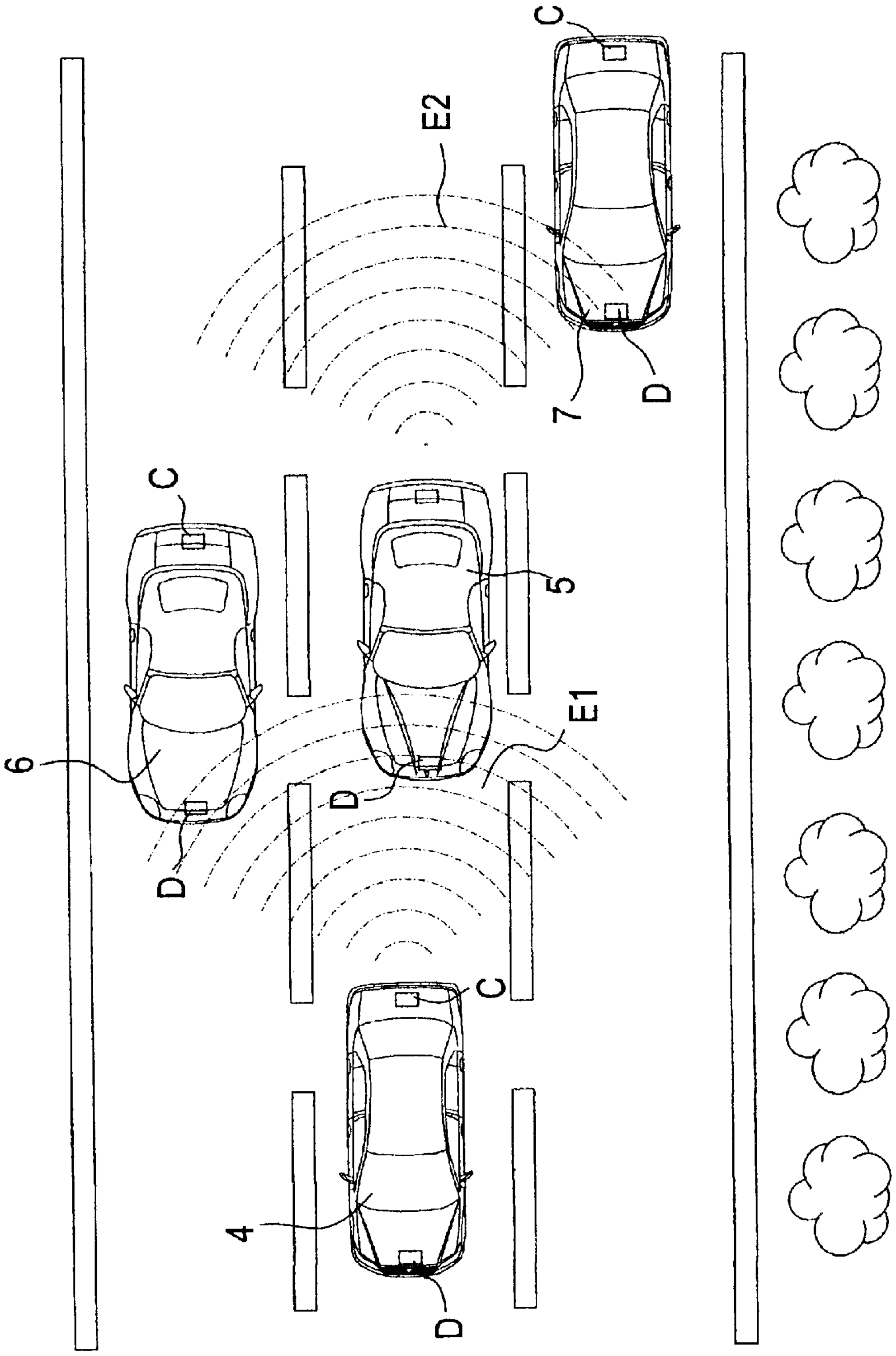
FIG. 4 shows the embodiment of the present invention.

In the second operation mode of the present invention, the front car is installed with the front car subsystem and the rear car is installed the front car subsystem and the rear car subsystem. The rear car receives the signals from the front cat, displays the signals. When the rear car is reversed or braked, the rear car transmits alarm signals to a car at a backside. This condition is illustrated in FIG. 4. With reference to FIG. 4, the first bank has a car 4, the second bank has two cars 5 and 6 and the third bank has a car 7. It is illustrated that the reverse or brake signals are transmitted from the car 4 to cars 5 and 6. Then, if the car 5 or 6 has reversed or braked, further alarm signals are transmitted to the car 7.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vehicle wireless alarm system comprises a front car subsystem installed in a front car and a rear car subsystem installed in a rear car; the front car being in front of the rear car; wherein the front car subsystem comprising:

- a reverse car sensor and a brake car sensor;
- an alarm source receiving signals from the reverse car sensor and the brake car sensor;
- an oscillator receiving signals from the alarm source for mixing the receiving signals with carriers signals;
- an encoder receiving signals from the oscillator for encoding the receiving signals;
- an amplifier receiving signals from the encoder for amplifying the input signals to have a larger power for transmission; and
- a transmitter for receiving the signals from the amplifier for emitting the receiving signals wirelessly as emitting signals;

the rear car subsystem comprising:

a receiver receiving the transmitting signals from the transmitter;

an amplifier receiving signals from the receiver for amplifying the signals;

a decoder for receiving signals from the amplifier for decoding the receiving signals;

an output device receiving signals from the decoder and outputting the receiving signals; and an alarm device receiving signals from the output device and emitting alarm signals;

wherein by above system, a driver in the rear car knows that the front car now reverses or brakes.

2. The vehicle wireless alarm system as claimed in claim 1, wherein the alarm signals are selected from one of speech signals, light signals, or texts.

3. The vehicle wireless alarm system as claimed in claim 1, wherein in a first operation mode, the front car is installed with the front car subsystem and the rear car is installed the rear car subsystem, the rear car receives the signals from the front car and display the signals.

4. The vehicle wireless alarm system as claimed in claim 1, wherein in a first operation mode, the front car is installed with the front car subsystem and the rear car is installed the front car subsystem and the rear car subsystem; the rear car receives the signals from the front car and displays the signals; when the rear car is reversed or braked, the rear car transmits alarm signals to a car at a back side.

* * * * *